(12) United States Patent
Tsurumoto

(10) Patent No.: US 6,510,555 B1  
(45) Date of Patent: Jan. 21, 2003

(54) INFORMATION PROVIDING APPARATUS AND METHOD, INFORMATION RECEIVING APPARATUS AND METHOD, AND TRANSMISSION MEDIUM

(75) Inventor: Takashi Tsurumoto, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/134,220

(22) Filed: Aug. 14, 1998

(30) Foreign Application Priority Data

Aug. 19, 1997 (JP) .............................. 9-222252

(51) Int. Cl.⁷ .......................... H04N 5/445; H04N 7/173
(52) U.S. Cl. .............................. 725/92; 725/39; 725/56; 725/98; 725/115; 725/118
(58) Field of Search .............................. 725/39, 87, 56, 725/57, 92, 98, 118, 115; 348/465, 715, 716, 717

(56) References Cited

U.S. PATENT DOCUMENTS

| | | | | |
|---|---|---|---|---|
| 5,121,377 A | * | 6/1992 | Short | |
| 5,367,329 A | * | 11/1994 | Nakagaki et al. | |
| 5,539,822 A | * | 7/1996 | Lett | ............................ 380/20 |
| 5,793,427 A | * | 8/1998 | Mills et al. | ................. 348/391 |
| 5,850,218 A | * | 12/1998 | LaJoie et al. | ................ 345/327 |
| 5,892,508 A | * | 4/1999 | Howe et al. | ................ 345/327 |
| 5,978,013 A | * | 11/1999 | Jones et al. | |
| 6,151,059 A | * | 11/2000 | Schein et al. | |

* cited by examiner

Primary Examiner—Bhavesh Mehta  
Assistant Examiner—Kieu-Oanh Bui  
(74) Attorney, Agent, or Firm—Lerner, David, Littenberg, Krumholz & Mentlik, LLP

(57) ABSTRACT

To transmit EPG information efficiently in a small volume of transmission, it is so disposed that SDTs corresponding to respective transponders are referred in an NIT stating the overall configuration of the network and necessary information for reception. In each SDT, a real channel for transmitting video signals and a corresponding dummy channel are provided in a pair, and the dummy channel is provided with a gEMT and a dEMT for stating information on events. An ETT is provided correspondingly to the real channel. In an ETT, a gEMT is caused to be referred to. In a dEMT, outline documents of events are stated, and in a gEMT information other than the outline documents of events is stated.

35 Claims, 15 Drawing Sheets

FIG. 6

TABLE CONFIGURATION IMAGE OF EPG

NIT (OVERALL CONFIGURATION OF THE NETWORK AND NECESSARY INFORMATION FOR RECEPTION ARE STATED. THERE IS ONE IN THE NETWORK.)

SDT (SERVICE INFORMATION IS STATED. THERE IS ONE IN EACH STREAM.)

pfEIT (INFORMATION ON THE CURRENT PROGRAM AND THE NEXT PROGRAM IS STATED. THERE IS ONE ON EACH CHANNEL.)

ETT (THE "event_id" AND THE BROADCAST START TIME OF EVERY PROGRAM AND THE SECTION NUMBER OF THE gEMT IN WHICH INFORMATION IS WRITTEN ARE STATED.)

gEMT (OTHER EVENT INFORMATION THAT NVOD IS STATED. THERE IS ONE IN EVERY DUMMY SERVICE OF N VOD CHANNELS.)

nEMT (INFORMATION ON EVENTS OF NVOD IS STATED. THERE IS ONE IN EVERY DUMMY SERVICE OF NVOD CHANNELS.)

dEMT (OUTLINE DOCUMENTS OF EVENTS ARE STATED. THERE IS ONE IN EVERY DUMMY SERVICE.)

rDMT (INDEXES OF MESSAGES ARE STATED.)

DMT (MESSAGES ARE STATED.)

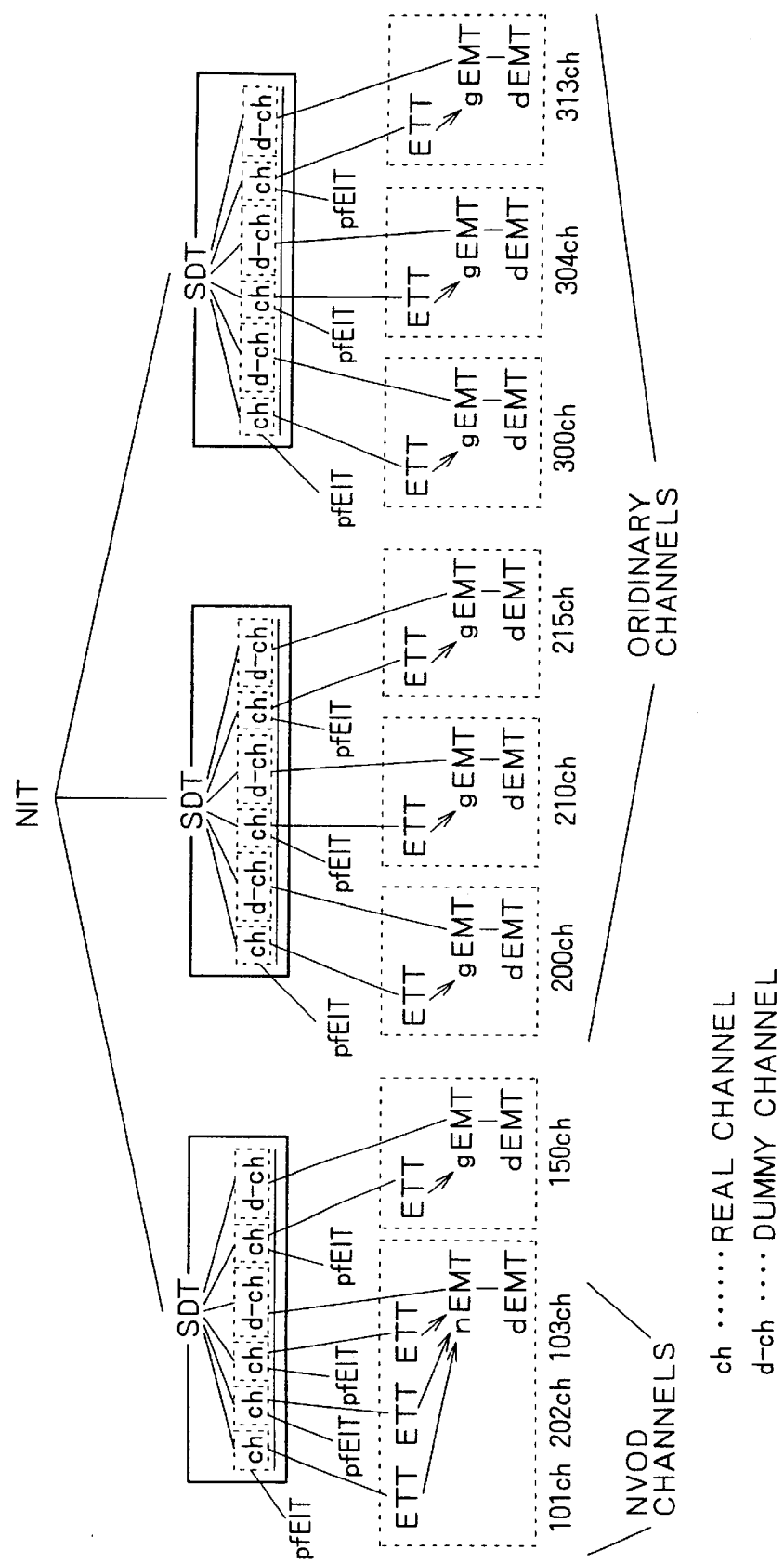

CONFIGURATION OF SCHEDULE TABLE

FIG. 9A

```
1ST INSTALLMENT

TITLE: THE STORY OF A LOVE AFFAIR (1)

INTRODUCTORY MESSAGE:
  IN 8 INSTALLMENTS. A WORK COMICALLY
EXPRESSING THE MOVES OF A YOUNG
WOMAN'S EMOTION. WHAT WILL BE THE
OUTCOME OF HER LOVE?
THE MAN WHO HAS SUDDENLY
APPEARED BEFORE YUKIE...
```

FIG. 9B

```
2ST INSTALLMENT

TITLE: THE STORY OF A LOVE AFFAIR (2)

INTRODUCTORY MESSAGE:
  IN 8 INSTALLMENTS. A WORK COMICALLY
EXPRESSING THE MOVES OF A TOUNG
WOMAN'S EMOTION. WHAT WILL BE THE
OUTCOME OF HER LOVE?
  YUKIE SUDDENLY MEETS HIM AGAIN.
THEN YUKIE ...
```

FIG. 11

LIST OF TITLES OF
NVOD PROGRAMS

```
· GIANT
· SUMMERTIME
· ROMAN HOLIDAY
· RED BEARD
· MODERN TIMES
· PEPELE MOKO
· SEVEN SAMURAI
```

FIG. 12

NVOD START TIME
SCHEDULE

```
GIANT
18:00 ~
19:00 ~
20:00 ~
21:00 ~
22:00 ~
```

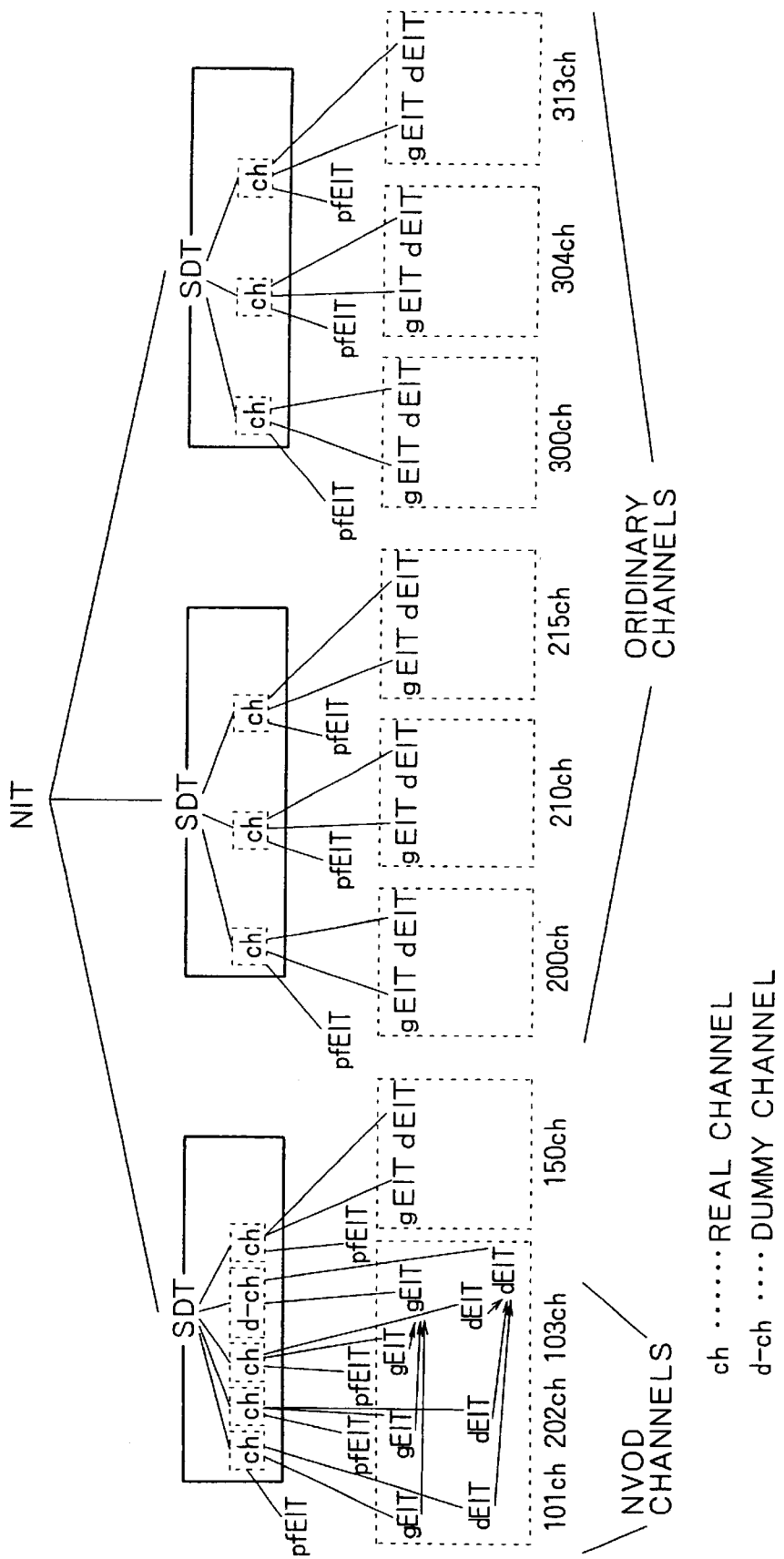

INFORMATION PROVIDING APPARATUS AND METHOD, INFORMATION RECEIVING APPARATUS AND METHOD, AND TRANSMISSION MEDIUM

BACKGROUND OF THE INVENTION

1. Detailed Description of the Invention

The present invention relates to an information providing apparatus and method, an information receiving apparatus and method, and a transmission medium and more particularly to an information providing apparatus and method, an information receiving apparatus and method, and a transmission medium enabled to provide information more efficiently by forming EPG information out of individual information and common information on [TV] programs.

2. Description of Related Art

Recently, digital television broadcasting was started in Japan, too, and programs have come to be offered to the audience on 100 or more channels. Such an increase in the number of programs complicates the operation to select a desired program out of them. Also, as the number of channels increases, on top of an increase in the quantity of the information involved, a program schedule for not only one day but also for a week or so ahead becomes required by the audience for watching programs in a planned manner. For this reason, the data quantity of the program schedule becomes tremendously large, and it becomes difficult for paper media, mainly newspapers, to provide program schedules as before. Moreover, in case there is a change in the broadcast schedule of any program, it is difficult to change the program schedule on a paper medium.

In this connection, it is proposed that an EPG (Electronic Program Guide) to support program selection should be transmitted from the program provider's side to the audience. As international standard on this EPG, the format of DVD_SI (Digital Video Broadcast Service Information) is prescribed.

If a program schedule is turned into data as EPG and offered to the audience, extraction of EPG data received by a receiving apparatus will enable the titles of programs, a program schedule, channel logos and the like to be indicated on the display, and the desired program to be quickly and correctly selected. Furthermore, any alteration in the broadcast time of a program can be easily coped with, and the viewer can correctly reserve the video recording of or watch the desired program.

FIG. 16 shows an example of a variety of tables constituting an EPG according to the prior art. An NIT (Network_Information_Table) states the overall configuration of the network and information necessary for reception, and one NIT exists for each network. In this NIT is stated an SDT (Service_Description_Table).

An SDT exists for each stream. For instance, if this EPG is to be transmitted via a satellite, an SDT is defined for each carrier wave (each transponder). In an SDT, information on the channel for transmission on the carrier wave is stated in pfEIT, gEIT and dEIT. In the pfEIT (present_following_Event_Information_Table) are stated the program currently broadcast on that channel and the next program. In the dEIT (detail-Event_Information_Table) is stated a document concerning an outline of the event (program), and in the gEIT (general-Event_Information_Table) is stated information other than the outline document concerning the program.

On the other hand, where NVOD (near video on demand) service is operated, a dummy channel (d-ch) is provided besides the channel on which program information is delivered (ch). In the dEIT and the gEIT of the dummy channel, the outline document and other information on the program broadcast by NVOD are respectively stated. On the other hand, in the dEIT and the gEIT of the channel on which the video information of NVOD is actually broadcast, the dEIT or the gEIT of the dummy channel is respectively stated and referred to.

Such an EPG providing method according to the prior art involved the following problems.

(1) The quantity of information becomes too vastly large to be fully transmitted.

In digital satellite broadcasting, the number of channels reaches 100 to 200, and the period of a program schedule is from 1 week to 2 weeks. For each program, a program outline of 200 to 400 full-width characters is stated. All these put together, the quantity of data to be transmitted as an EPG would be 10 Mbytes to 20 Mbytes. This quantity of data, if converted into the number of newspaper pages, would be from 140 to 200 pages. In satellite broadcasting, the capacity of one transponder is 34 Mbps and, if the data quantity of an EPG is 10 Mbytes (=80 Mbits), it would take about 3 seconds (=80 Mbits/30 Mbps) to send all these data.

Since an EPG essentially is information incidental to programs and to be transmitted by using part of what is mainly intended for the transmission of video information and audio information, it is difficult to use a whole transponder. Supposing 10% of a transponder is used for EPG transmission, it will take nearly 30 seconds to send all the EPG data of 80 Mbits.

(2) The access speed is slow.

If all EPG information is stored and made accessible on the side of the receiving apparatus, the viewer, when desiring to look at the program schedule, can immediately have it shown on the display. However, if this is to be done, a memory of a large capacity will have to be provided on the receiving apparatus side, resulting in not only an enlarged circuit scale but an increased cost. A receiving apparatus generally is a consumer item, and should desirably be as inexpensive as possible. Should a memory be mounted on it, the cost of the receiving apparatus would be doubled on that account alone.

Then, if EPG data are not stored in the receiving apparatus and extracted as appropriate from the transmission wave when required, no memory of a very large capacity will be needed. In this case, if the receiving apparatus is to be able to take in required information as soon as possible, it will be necessary for the transmitting side to transmit EPG information reiteratively at comparatively short intervals. However, since it is impossible to transmit a large quantity of data by using a limited frequency band, the transmission intervals will be inevitably extended. As a result, there was the problem that, when an attempt was made on the side of the receiving apparatus to take in EPG data, it would be impossible to receive the desired data quickly and the time taken to display the program schedule tended to be extended.

(3) It is troublesome to manage EPG information on the transmitting apparatus side.

In order to make the desired information more readily accessible by the receiving apparatus, on the transmitting side a program schedule for 1 day (24 hours) is divided by eight into 3-hour segments for each channel and delivered as such. Therefore, when a program schedule for 1 week is to be delivered, 56 (=8×7) 3-hour program schedules will be needed, and the number of program schedules for 200 channels will reach 11200 (=56×200).

(4) The delivery efficiency of 3-hour program schedules is poor.

Whereas 56 3-hour program schedules will be needed per service (per channel) as stated above, waste will arise when these program schedules are transmitted in the format of MPEG2 transport stream. Thus, the capacity of 1 packet of MPEG2 transport stream is supposed to be 188 bytes. While the program schedule of 1 program can be stated in 70 bytes, if the number of programs to be broadcast in 3 hours is 1, a program schedule having a capacity of only 70 bytes is delivered in 188 bytes, resulting in the stuffing of the difference of 118 (=188−70) bytes with dummy data.

Or where the number of programs to be broadcast in 3 hours is 3, the quantity of data needed to state them is 210 (=70×3) bytes. If they are packeted in units of 188 bytes each, one packet will be fully used, but the second packet will be utilized for only 22 bytes, resulting in the wasting of 166 (=188−22) bytes.

Further, where no program is to be broadcast in 3 hours, only dummy data will be transmitted. Because, even if there is no information to be transmitted, a packet should be transmitted to search for the access position of the receiving apparatus. As a result, data corresponding to 30% to 40% of the quantity of information actually transmitted become substantially wasted data.

(5) The beginning of the program schedule cannot be retrieved in a single attempt.

It is so disposed as to transmit the program scheduled in 3-hour segments. When, for instance, a program schedule of programs whose broadcasting will start on or after 3:00 is to be displayed, first the program schedule for the time range of 3:00 to 5:59 is searched. Here, since the program schedule for this time range covers hours from 3:00 on, programs to be broadcast between 3:00 and 3:59 need to be displayed in the program schedule. If no program beginning between 3:00 and 3:59 is stated in the program schedule for 3:00 to 5:59, some program may be stated in the program schedule for the time range of 0:00 to 2:59. So, the program schedule for this time range is searched. If no program can be retrieved by this search, the program broadcast in that time range may have a still earlier broadcast start time. Then, again, the program schedule for the immediately prior time range will be searched. Such searching operation will be executed repeatedly until the program is retrieved. As a result, a long time would be needed before it becomes possible to display the result of search.

Of if the broadcast for the day on a given channel starts at 4:00, there will be no program in the hours before that, but, as this fact cannot be stated, the absence of a program will remain unknown unless the program schedules back to the final program of the previous day are searched. This adds to the time taken to retrieve a program.

(6) Since the coverage of the program schedule is unknown, the handling convenience is deteriorated.

As the program schedule is transmitted in 3-hour segments for each channel, one cannot know how many days ahead from the present time are covered by the transmitted program schedule by looking at the program schedule for only one time segment. Then, to find this out, program schedules for further time segments ahead should be searched successively and, when no program can be retrieved eventually, it is determined that there is no further program schedule. As a result, when the viewer instructs displaying of a program schedule for a day some time ahead, he or she will be kept waiting for a long time eventually to find the displaying of a message to the effect that there is no program schedule for the day, and be given an extremely disagreeable impression.

SUMMARY OF THE INVENTION

The present invention addresses such a situation and makes possible more efficient transmission of EPG information.

According to an aspect of the invention, an information providing apparatus includes first generating means for generating first information including the identification code of a television [TV] program, the broadcast start time of the TV program, and information on reference to second information; second generating means for generating the second information including information on the TV program; and synthesizing means for synthesizing the first information and the second information as EPG information.

According to another aspect of the invention, an information providing method includes a first generating step to generate first information including the identification code of a television [TV] program, the broadcast start time of the TV program, and information on reference to second information; a generating step to generate the second information including information on the TV program; and a synthesizing step to synthesize the first and second information as EPG information.

According to a further aspect of the invention, a transmission medium for transmitting a computer program includes a first generating step to generate first information including the identification code of a television [TV] program, the broadcast start time of the TV program, and information on reference to second information; a second generating step to generate the second information including information on the TV program; and a synthesizing step to synthesize the first and second information as EPG information.

According to yet another aspect of the invention, an information receiving apparatus includes receiving means for receiving signals including EPG information generated by synthesizing first information including the identification code of a television [TV] program, the broadcast start time of the TV program, and information on reference to second information, and the second information including information on the TV program; extracting means for extracting the EPG information from the signals received by the receiving means; and control means for controlling the displaying of the EPG information extracted by the extracting means.

According to a still further aspect of the invention, an information receiving method includes a receiving step to receive signals including EPG information generated by synthesizing first information including the identification code of a television [TV] program, the broadcast start time of the TV program, and information on reference to second information, and the second information including information on the TV program; an extracting step to extract the EPG information from the signals received at the receiving step; and a control step to control the displaying of the EPG information extracted at the extracting step.

According to an additional aspect of the invention, a medium for transmitting a computer program that includes a receiving step to receive signals including EPG information generated by synthesizing first information including the identification code of a television [TV] program, the broadcast start time of the TV program, and information on reference to second information, and the second information including information on the TV program; an extracting step to extract the EPG information from the signals received at the receiving step; and a control step to control the displaying of the EPG information extracted at the extracting step.

According to still another aspect of the invention, an information providing system transmits EPG information, superimposed on video signals, from an information providing apparatus and receives the EPG information with an information receiving apparatus. The information providing apparatus includes first generating means for generating first information including the identification code of a television [TV] program, the broadcast start time of the TV program, and information on reference to second information; second generating means for generating the second information including information on the TV program; and synthesizing means for synthesizing the first and second information as EPG information. The information receiving apparatus includes receiving means for receiving signals including video signals and EPG information; extracting means for extracting the EPG information from the signals received by the receiving means; and control means for controlling the displaying of the EPG information extracted by the extracting means.

According to yet a further aspect of the invention, an information providing method transmits EPG information, superimposed on video signals, from an information providing apparatus and receives the EPG information with an information receiving apparatus. The information providing apparatus is provided with a first generating step to generate first information including the identification code of a TV program, the broadcast start time of the TV program, and information on reference to second information; a second generating step to generate the second information including information on the TV program; and a synthesizing step to synthesize the first and second information as EPG information. The information receiving apparatus is provided with: a receiving step to receive signals including video signals and EPG information; an extracting step to extract the EPG information from the signals received at the receiving step; and a control step to control the displaying of the EPG information extracted at the extracting step.

According to yet an additional aspect of the invention, a medium for transmitting computer programs for use in an information providing system transmits EPG information, superimposed on video signals, from an information providing apparatus and receives the EPG information with an information receiving apparatus. A computer program for the information providing apparatus is provided with a first generating step to generate first information including the identification code of a TV program, the broadcast start time of the TV program, and information on reference to second information; a second generating step to generate the second information including information on the TV program; and a synthesizing step to synthesize the first and second information as EPG information. A program for the information receiving apparatus is provided with a receiving step to receive signals including video signals and EPG information; an extracting step to extract the EPG information from the signals received at the receiving step; and a control step to control the displaying of the EPG information extracted at the extracting step.

In the above-described information providing apparatus, information providing method, and transmission medium, EPG information is synthesized from the first information including the identification code of a TV program, the broadcast start time of the TV program, and information on reference to second information; and the second information including information on the TV program.

In the above-described information receiving apparatus, information receiving method, and transmission medium, EPG information synthesized from the first information including the identification code of a TV program, the broadcast start time of the TV program, and information on reference to second information, the second information including information on the TV program is extracted from received signals; and its display is controlled.

In the above-described information providing system, information providing method, and transmission medium, EPG information is synthesized in the information providing apparatus from the first information including the identification code of a TV program, the broadcast start time of the TV program, and information on reference to second information; and the second information including information on the TV program. Further in the receiving apparatus, EPG information synthesized from the first information including the identification code of a TV program, the broadcast start time of the TV program, and information on reference to the second information, and the second information including information on the TV program is extracted from received signals; and its display is controlled.

BRIEF DESCRIPTION OF THE DRAWINGS

FIG. 6 is a diagram for explaining the capacities of tables.

FIG. 7 is a diagram for explaining reference relationships among tables.

FIGS. 9A and 9B are diagrams illustrating examples of how an EPG is displayed.

FIG. 11 is a diagram illustrating an example of how a list of titles of NVOD programs is displayed.

FIG. 12 is a diagram illustrating an example of how start times of an NVOD program are displayed.

FIG. 16 is a diagram for explaining the relationships among tables according to the prior art.

DETAILED DESCRIPTION OF THE PREFERRED EMBODIMENTS

Whereas modes of carrying out the present invention will be described below, a description of the characteristics of the invention with the parenthesized addition of a corresponding mode of carrying out (though only one example) following each means to identify the relationships of correspondence between the respective means of the invention stated in the Scope of the Claims and the following modes of carrying out will be as follows. However, this description of course does not mean limitation of the means to what are described.

Figure 2:
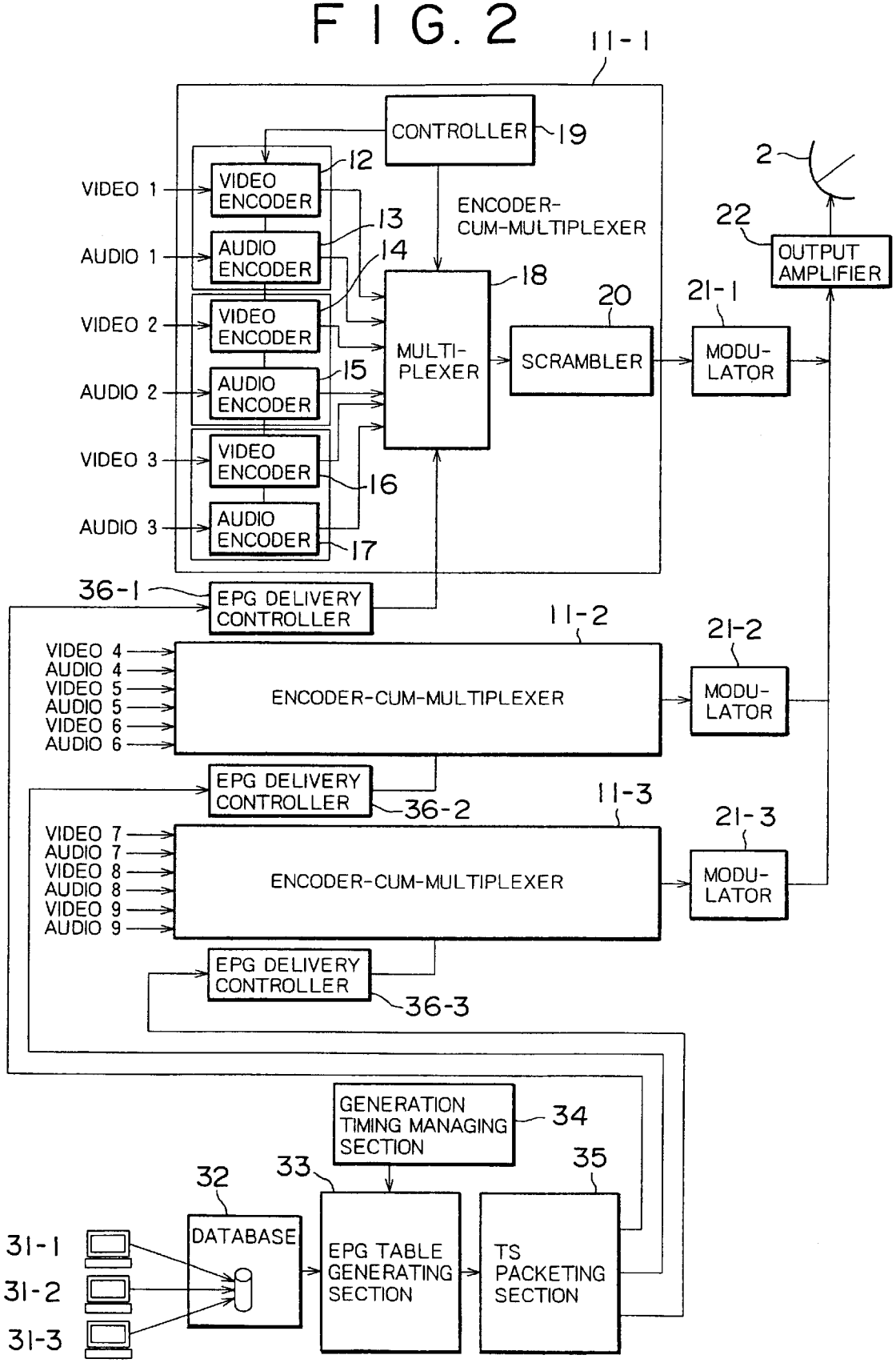
FIG. 2 is a block diagram illustrating an example of configuration of the transmitting apparatus in FIG. 1.
Figure 3:
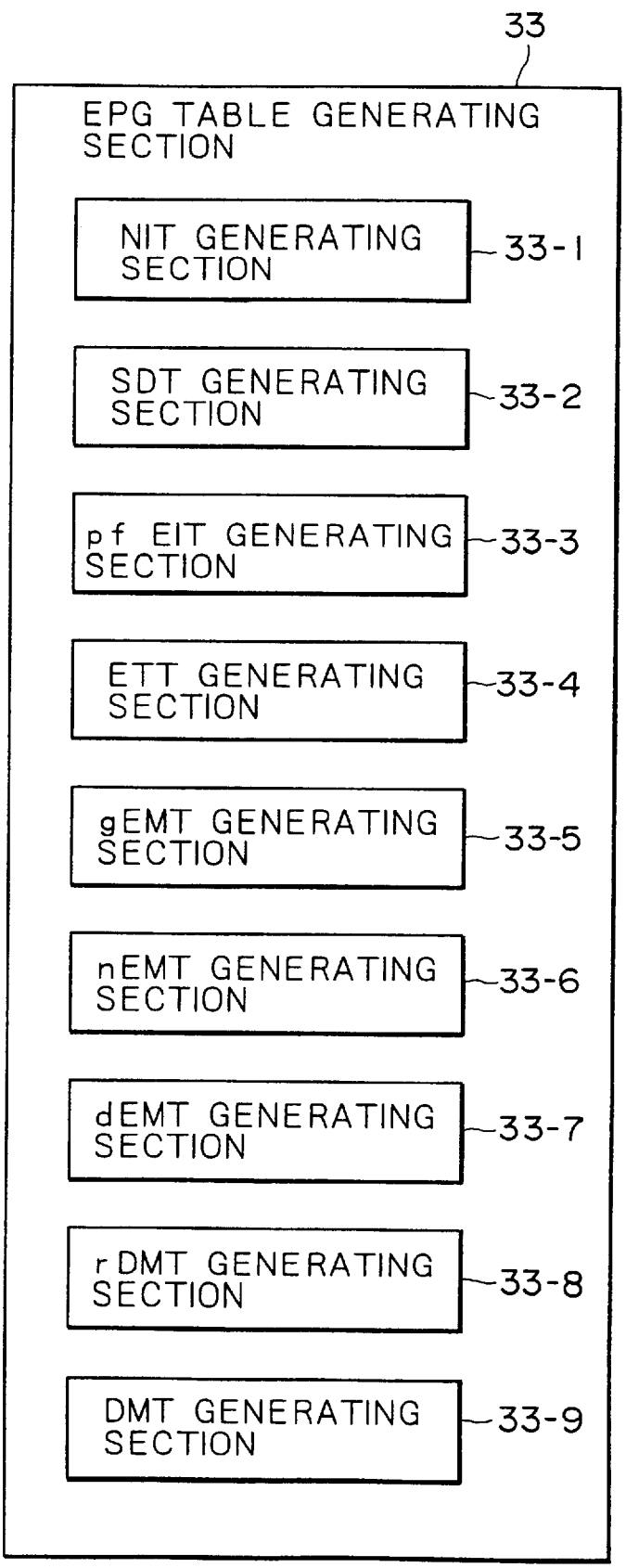
FIG. 3 is a block diagram illustrating an example of configuration of the EPG table generating section in FIG. 1.

An information providing apparatus is provided with first generating means (for example an ETT generating section 33-4 in FIG. 3) for generating first information including the identification code of a TV program, the broadcast start time of the TV program, and information on reference to second information; second generating means (for example a gEMT generating section 33-5, an nEMT generating section 33-6, a dEMT generating section 33-7 in FIG. 3) for generating the second information including information on the TV program; and synthesizing means (for example a TS packeting section 35 in FIG. 2) for synthesizing the first information and the second information as EPG information.

An information receiving apparatus is provided with receiving means (for example a front end section 51 in FIG. 4) for receiving signals including the EPG information generated by synthesizing the first information including the identification code of a TV program, the broadcast start time of the TV program, and information on reference to second information, and the second information including information on the TV program; extracting means (for example a demultiplexer 57 in FIG. 4) for extracting the EPG information from the signals received by the receiving means; and control means (for example an EPG processor 59 in FIG. 4) for controlling the displaying of the EPG information extracted by the extracting means.

In an information providing system the information providing apparatus is provided with first generating means (for example the ETT generating section 33-4) for generating the first information including the identification code of a TV program, the broadcast start time of the TV program, and information on reference to second information; second generating means (for example the gEMT generating section 33-5, the nEMT generating section 33-6, the dEMT generating section 33-7 in FIG. 3) for generating the second information including information on the TV program; and synthesizing means (for example the TS packeting section 35 in FIG. 2) for synthesizing the first and second information as EPG information; and the information receiving apparatus is provided with receiving means (for example the front end section 51 in FIG. 4) for receiving signals including video signals and EPG information; extracting means (for example the demultiplexer 57 in FIG. 4) for extracting the EPG information from the signals received by the receiving means; and control means (for example the EPG processor 59 in FIG. 4) for controlling the displaying of the EPG information extracted by the extracting means.

Figure 1:
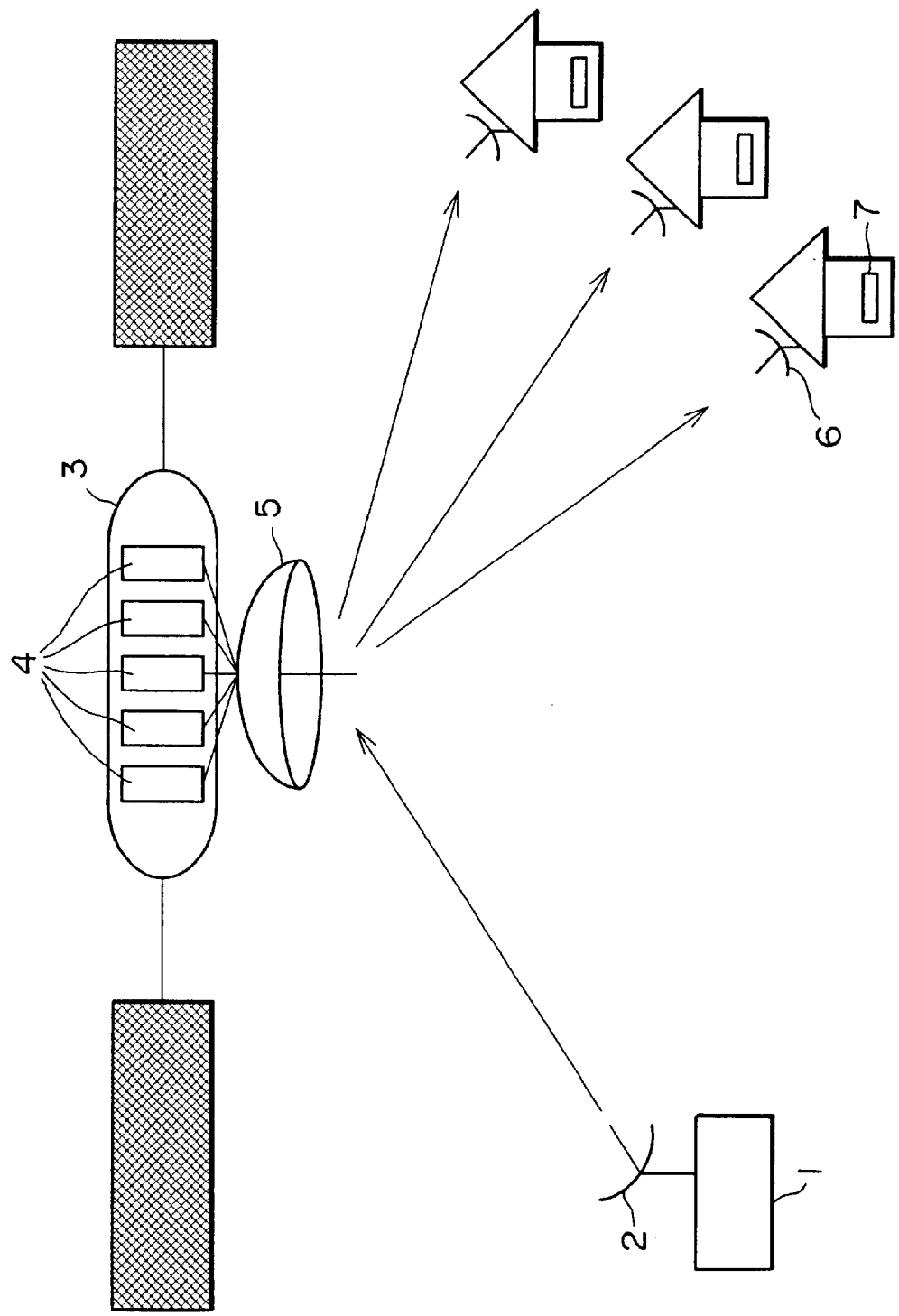
FIG. 1 is a diagram illustrating an example of configuration of an information providing system to which the present invention is applied.

FIG. 1 illustrates an example of configuration of an information providing system to which the present invention is applied. A transmitting apparatus 1 multiplexes EPG information with program information, and transmits it from a transmitting antenna 2 to a satellite 3. The satellite 3 receives these signals with an antenna 5. The satellite 3 has a plurality of transponders 4, and transmits the signals from the transmitting apparatus 1 to individual families over carrier waves which differ from transponder to transponder. At each family, a receiving apparatus 7 receives via a receiving antenna 6 signals transmitted from the satellite 3.

FIG. 2 illustrates an example of configuration of the transmitting apparatus 1. An encoder-cum-multiplexer 11-1 has video encoders 12, 14 and 16 and audio encoders 13, 15 and 17. The video encoders 12, 14 and 16 are so disposed as to encode respectively inputted video signals by the MPEG2 system, and to output them to a multiplexer 18. The audio encoders 13, 15 and 17 are so disposed as to encode inputted audio signals by the MPEG system, and to output them to the multiplexer 18.

A controller 19 is so disposed as not only to control encode processing by the video encoder 12 or the audio encoder 17 but also to control multiplex processing by the multiplexer 18. A scrambler 20 is so disposed as to scramble multiplexed signals supplied from the multiplexer 18, and to output them to a modulator 21-1.

Encoder-cum-multiplexers 11-2 and 11-3 are configured similarly to the encoder-cum-multiplexer 11-1.

It is so disposed that EPG information inputted at EPG input terminals 31-1 to 31-3 is accumulated as raw data in a database 32. An EPG table generating section 33 is so disposed as to generate EPG tables from the raw data accumulated in the database 32, and to output them to a TS packeting section 3. A generation timing managing section 34 generates a prescribed timing signal, and outputs it to the EPG table generating section 33.

In the EPG table generation section 33 are provided generating sections 33-1 to 33-9 for generating individual tables. An NIT generating section 33-1 generates NIT; an SDT generating section 33-2, SDT; a pfEIT generating section 33-3, pfEIT; an ETT generating section 33-4, ETT; a gEMT generating section 33-5, gEMT; an nEMT generating section 33-6, nEMT; a dEMT generating section 33-7, dEMT; an rDMT generating section 33-8, rDMT; and a DMT generating section 33-9, DMT.

EPG delivery controllers 36-1 to 36-3 are so disposed as to supply EPG data in respective tables, supplied from the TS packeting section 35, to the multiplexers of the corresponding encoder-cum-multiplexers 11-1 to 11-3.

Modulators 21-1 to 21-3 FEC-encode (FEC=Forward Error Correction) as well as QPSK-modulate streams supplied from the corresponding encoder-cum-multiplexers 11-1 to 11-3, and output them to an output amplifier 22. The output amplifier 22 is so disposed as to amplify the modulated signals supplied from the modulators 21-1 to 21-3, and to output them toward the satellite 3 via the transmitting antenna 2.

In this example of configuration, each of the encoder-cum-multiplexers 11-1 to 11-3 uses one transponder 4 of the satellite 3. Therefore, in this example of configuration, video signals are distributed to individual families via a total of three transponders.

Thus, in the encoder-cum-multiplexer 11-1, the video encoders 12, 14 and 16 encode video signals for three channels. Also, the audio encoders 13, 15 and 17 encode audio signals respectively corresponding to the video signals. For instance, the video encoder 12 encodes a first video signal by the MPEG2 system, and outputs it to the multiplexer 18. The audio encoder 13 encodes an audio signal corresponding to the video signal inputted to the video encoder 12 by the MPEG system, and outputs it to the multiplexer 18. Similarly, the video encoders 14 and 16 and the audio encoders 15 and 17 also encode video signals and audio signals on their respective channels, and output them to the multiplexer 18. The controller 19 controls encode processing by the video encoders 12, 14 and 16 and the audio encoders 13, 15 and 17.

The multiplexer 18 multiplexes the outputs of the video encoders 12 to the audio encoder 17 under the control of the controller 19.

In the encoders 11-2 and 11-3, too, processing similar to that in the aforementioned encoder 11-1 takes place.

As the video signals and the audio signals are digitally compressed by the respective encoders, it is made possible to ensure effective utilization of the transmission paths.

From the EPG input terminals 31-1 to 31-3, network information corresponding to NIT, channel information corresponding to SDT, program information corresponding to pfEIT, ETT and EMT information, message information corresponding to DMT and the like are inputted, and accumulated in the database 32 as raw data. The EPG table generating section 33, on the basis of a timing signal supplied from the generation timing managing section 34, searches for raw data for the tables to be generated (tables including NIT, SDT, pfEIT, ETT, EMT and DMT), and prepares the tables.

The tables which are prepared are TS-packeted (TS= Transport Stream) by the TS packeting section 35, and supplied to EPG delivery controllers 36-1 to 36-3.

As will be described in further detail later, out of the tables, dEMT supplies the same data reiteratively in, for instance, 4-second cycles. Other tables (NIT, SDT, pfEIT, ETT, gEMT, nEMT, rDMT and DMT) supply the same data reiteratively in 1-second cycles.

The EPG delivery controller 36-1 supplies the data of the supplied tables to the multiplexer 18. The multiplexer 18, under the control of the controller 19, multiplexes the encoded video signals and audio signals; it further multiplexes the EPG packet supplied from the EPG delivery controller 36-1, and outputs them serially.

The scrambler 20, after scrambling the data supplied from the multiplexer 18, outputs them to the modulator 21-1. The modulator 21-1 FEC-encodes the inputted data, and further QPSK-modulates them. And it supplies the modulated signals to the output amplifier 22. The output amplifier 22 amplifies the inputted data, and transmits them toward the satellite 3 via the transmitting antenna 2.

Similar processing also takes place in the encoder-cum-multiplexers 11-2 and 11-3 and the modulators 21-2 and 21-3.

The transport stream outputted from the encoder-cum-multiplexer 11-2 is received by the antenna 5 of the satellite 3, processed by a first transponder out of the transponders 4, and distributed to families over a first carrier wave from the antenna 5. Similarly, signals of bit streams transmitted from the encoder-cum-multiplexers 11-2 and 11-3 are received by the antenna 5, respectively processed by second and third transponders out of the transponders 4, and distributed to families over second and third carrier waves via the antenna 5.

Figure 4:
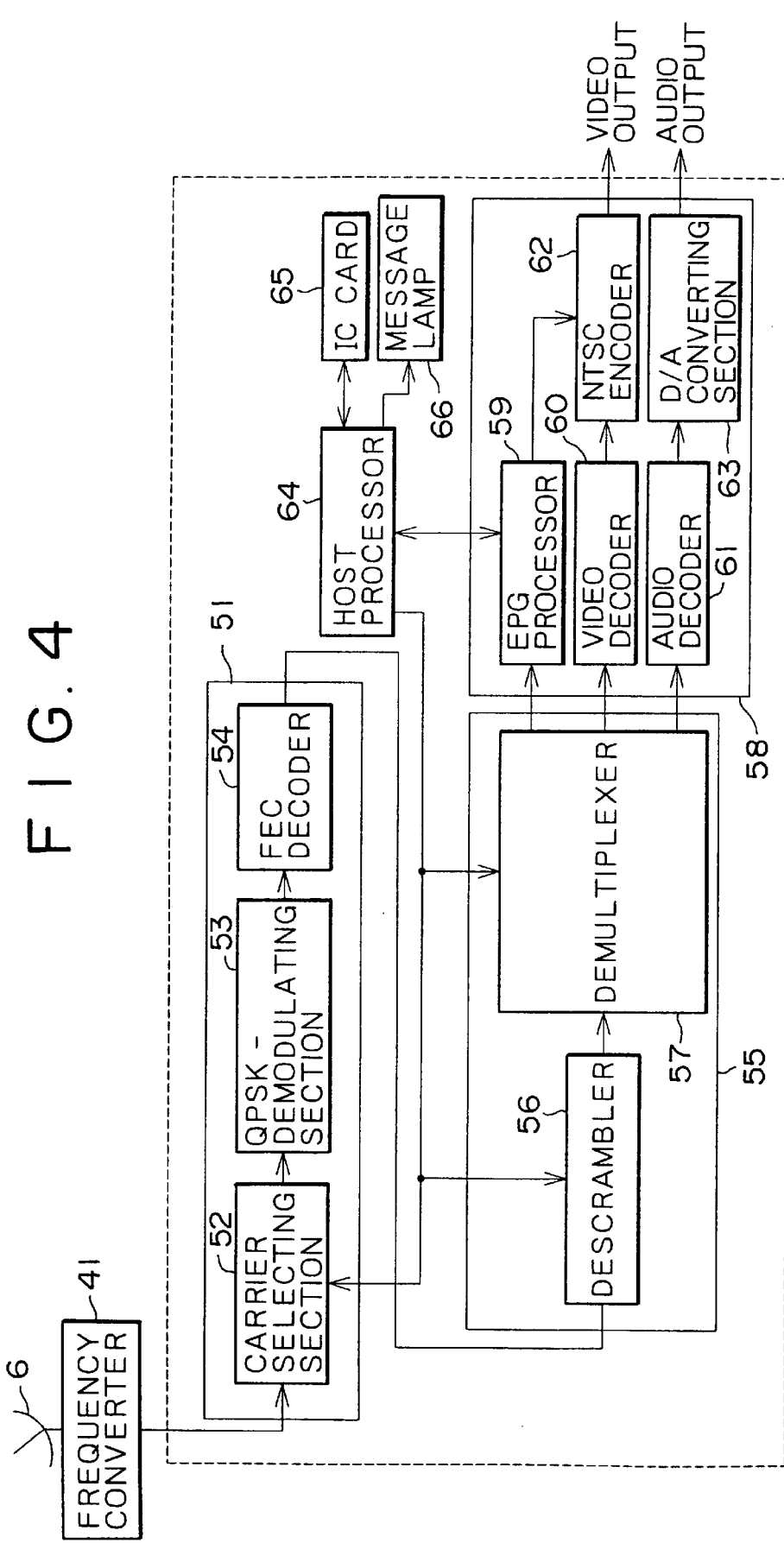
FIG. 4 is a block diagram illustrating an example of configuration of the receiving apparatus in FIG. 1.

FIG. 4 illustrates an example of detailed configuration of the receiving apparatus 7. A frequency converter 41 is so disposed as to convert signals on a prescribed carrier wave, supplied from the receiving antenna 6, into signals of an intermediate frequency, and to output them to the front end section 51. The front end section 51 has a carrier selecting section 52, a QPSK-demodulating section 53 and an FEC-decoder 54. The carrier selecting section 52 is so disposed as to select signals on a carrier wave of a prescribed frequency out of the intermediate frequency signals inputted from the frequency converter 41, and to output them to the QPSK-demodulating section 53. The QPSK-demodulating section 53 is so disposed as to QPSK-demodulate the signals inputted from the carrier selecting section 52, and to output them to the FEC-decoder 54. The FEC-decoder 54 FEC-processes the inputted signals, and outputs them to a transport section 55.

The transport section 55 is so disposed, after descrambling the output of the FEC decoder 54 with a descrambler 56, as to output it to the demultiplexer 57. The demultiplexer 7 separates a plurality of sets of video data or audio data contained in the TS packet and the EPG data. This multiplex processing is controlled by a host processor 64. The multiplexer 57 is so disposed as to demultipiex the signals inputted from the descrambler 56, and to output the video data to a video decoder 60, the audio data to an audio decoder 61, and the EPG data to the EPG processor 59.

The audio decoder 61 is so disposed as to decode the inputted audio data by the MPEG system, and to output them to a D/A-converting section 63. The D/A-converting section 63 D/A-converts the audio data inputted from the audio decoder 61, and outputs them to a loudspeaker or the like not shown.

The video decoder 60 decodes the inputted video data by the MPEG2 system, and outputs them to an NTSC encoder 62. The NTSC encoder 62 is disposed as to convert the inputted video data into video signals of the NTSC system, and to output them.

The EPG processor 59 is so disposed as to supply, in response to an instruction from the host processor 64, the contents of the EPG data to the host processor 64, at the same time to generate data for on-screen displaying, and to output them to the NTSC encoder 62.

In an IC card 65 are recorded information for conditional access and the like, and the host processor 64 is so disposed as to control, in response to the information stored in this IC card 65, a descrambler 56 to cause it to execute scramble processing. A message lamp 66 drives the host processor 64 as required.

Next will be described its operation. The frequency converter 41 converts signals received by the receiving antenna 6 into signals of a prescribed intermediate frequency, and outputs them to the front end section 51. The host processor 64 controls the carrier selecting section 52 in response to an instruction from the user to have it choose a carrier wave of a prescribed frequency. Thus, signals on a carrier outputted by a prescribed transponder are selected by the carrier selecting section 52, and supplied to the QPSK-demodulating section 53. The QPSK-demodulating section 53 QPSK-demodulates entered signals, and outputs them to the FEC decoder 54. The FEC decoder 54 FEC-processes the inputted signals, and outputs them to the descrambler 56.

The host processor 64, where the program on the channel whose reception has been instructed by the viewer is scrambled, reads out information concerning conditional access stored in the IC card 65, and controls the descrambler 56 in response to that information. Thus, where conditional access is allowed, the descrambler 56 descrambles the scrambled TS packet inputted from the FEC decoder 54, and outputs it to the demultiplexer 57. Where conditional access is not allowed, the host processor 64 forbids the descrambler 56 from executing descrambling. As a result, in effect, the viewer cannot watch that program.

The demultiplexer 57, in response to an instruction from the host processor 64, extracts a video packet on 1 designated channel out of programs on 3 channels included in 1 carrier and the data of an audio packet corresponding to it, and outputs them to the video decoder 60 and the audio decoder 61, respectively. The video recorder 60 decodes the data in the inputted video packet by the MPEG2 system, and outputs them to the NTSC encoder 62. The NTSC encoder 62 converts the inputted video data into video signals of the NTSC system, supplies them to a display unit not shown, and causes them to be displayed. The audio decoder 61 decodes the inputted audio data by the MPEG system, and outputs them to the D/A-converting section 63. The D/A-converting section 63 D/A-converts the inputted data, and outputs them to a loudspeaker not shown.

The demultiplexer 57, where EPG data are included in the data supplied from the descrambler 56, extracts them, and outputs them to the EPG processor 59. The EPG processor 59, in response to an instruction from the host processor 64, processes these EPG data, generates data to be displayed on screen as required, and outputs them to the NTSC encoder 62. The NTSC encoder 62 superimposes the on-screen data inputted from the EPG processor 59 over the video signals of the NTSC system generated correspondingly to the video data supplied from the video decoder 60, and outputs them. A program schedule is there by displayed, superimposed on received pictures, as required.

Figure 5:
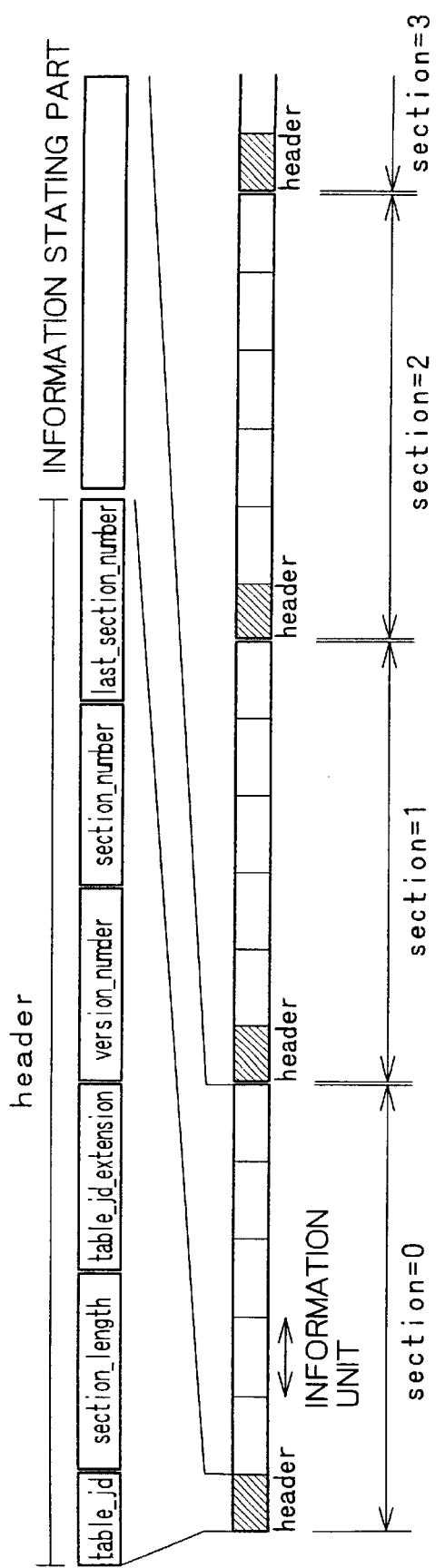
FIG. 5 is a diagram for explaining the transmission format for tables.

Next, details of the tables constituting an EPG will be further described. FIG. 5 shows a format where various tables constituting an EPG are to be transmitted. As shown in the figure, in this format, a table is divided into any desired number of sections and transmitted. Data in the sections of the desired number prescribed here are reiteratively transmitted in either 1-second or 4-second cycles.

Each section is composed of a header and any desired number of information units. The maximum length of 1 section is supposed to be 4096 bytes.

At the leading edge of the header is arranged a "table_id" denoting the kind of the table. This "table_id" is supposed to be 0×40 for NIT, 0×42 or 0×46 for SDT, 0×4e or 0×4f for pfEIT, 0×A2 or 0×A3 for ETT, 0×A4 for gEMT, 0×A5 for nEMT, 0×A7 for dEMT, 0×92 for DMT and 0×93 for rDMT.

Next to the "table_id" the length of the section including this header is expressed as "section_length" in bytes. The maximum value of the section length is determined in advance for each kind of table.

Next to "section_length" is arranged "table_id_extension". A plurality of tables having the same "table_id" are generated. For instance, SDT is generated for each stream; pfEIT and ETT, for each channel; and EMT, for each dummy service. Then, to distinguish them from one another, "table_id_extension" is used. Thus, here is stated, for example, the stream number in the case of SDT, or the channel number in the cases of pfEIT and ETT.

Next is arranged a "version_number". Here is stated the version number when the table is updated. Where any of the information units is revised, the receiving apparatus 7 is notified of the revision in contents by incrementing this "version_number".

Next to the "version_number" is arranged a "section_number". Here is stated the number of the section to which that header belongs. This number denotes the position of that section in the overall numerical sequence. As the maximum length of a section is determined in advance, when it is necessary to write in data beyond this maximum length, the data are stated divided into a plurality of sections. The section number begins from 0, and increments by 1 at a time up to a maximum of 255. Where division into sections is done, the headers of individual sections differ only in this "section_number", and are the same in other respects as those of the corresponding sections.

Next to the "section_number" is arranged a "last_section_number". Here is stated the final "section_number" of the table.

In each information unit of the information statement part, 1 piece of channel information is stated in the case of SDT; 1 piece of program information in the cases of pfEIT and EMT; 1 message in the case of DMT; and event information for 1 day in the case of ETT.

FIG. 6 schematically illustrates the contents of the tables constituting an EPG and their data quantities. In NIT (Network_Information_Table), the overall configuration of the network and necessary information for reception are stated.

In an SDT (Service_Description_Table) is stated service information. This SDT is prescribed for each stream.

In a pfEIT (present_following_Event_Information_Table) is stated information on the present program and the next program. This pfEIT is prescribed for each channel.

In an ETT (Event_Time_Table) are stated the "event_id" (program identification sign), the broadcast start time of every program and the section number of the gEMT to be referred to.

In a gEMT (general-Event_Material_Table) is stated other event information than NVOD. This gEMT is prescribed for each dummy service.

In annEMT (near-video-on-Demand_Event_Material_Table) is stated NVOD event information. This nEMT is prescribed for each dummy service on an NVOD channel.

While gEMT and nEMT are distinguished from each other and information on events other than NVOD or information on NVOD events is to be stated in each, the two may as well be unified into a common EMT and, if an NVOD event is to be stated in it, a flag indicating that the statement is a statement concerning NVOD may be stated.

In a dEMT (detail-Event_Material_Table) is stated an event outline document. This dEMT is prescribed for each dummy service.

In an "rDMT" (reference-Digital_Message_Table) is stated the index of a message. And the message is stated in a "DMT".

As shown in FIG. 6, the data quantity of an NIT is smaller than the data quantity of an SDT. A pfEIT and an ETT have smaller data quantities than a gEMT. A dEMT, as it is intended to state an event outline document, has a considerably larger data quantity than a gEMT or an nEMT.

An "rDMT", as it is the mere index of a message, has a smaller data quantity than a DMT and only slightly larger than an NIT. A "DMT", though having a greater data quantity than an "rDMT", has a smaller data quantity than a gEMT or an nEMT.

FIG. 7 illustrates relationships of reference among different tables. In the NIT, in which the overall configuration of the network and necessary information for reception are to be stated, a plurality of SDTs to be referred to are stated. One such SDT is prescribed for each carrier wave (transponder), in other words, for each stream. Each SDT includes the channel (ch) contained in that stream and the dummy channel (d-ch) corresponding thereto. What the viewer can actually select is only real channels, but no dummy channel can be selected. In a real channel, a pfEIT and an ETT are provided corresponding to each other, and in a dummy channel, a gEMT and a dEMT corresponding thereto are provided.

In a pfEIT, information on the program broadcast at present on that channel and the program to be broadcast next is stated. In an ETT, a gEMT and a dEMT (schedule table), information is stated as illustrated in FIG. 8.

Figure 8:
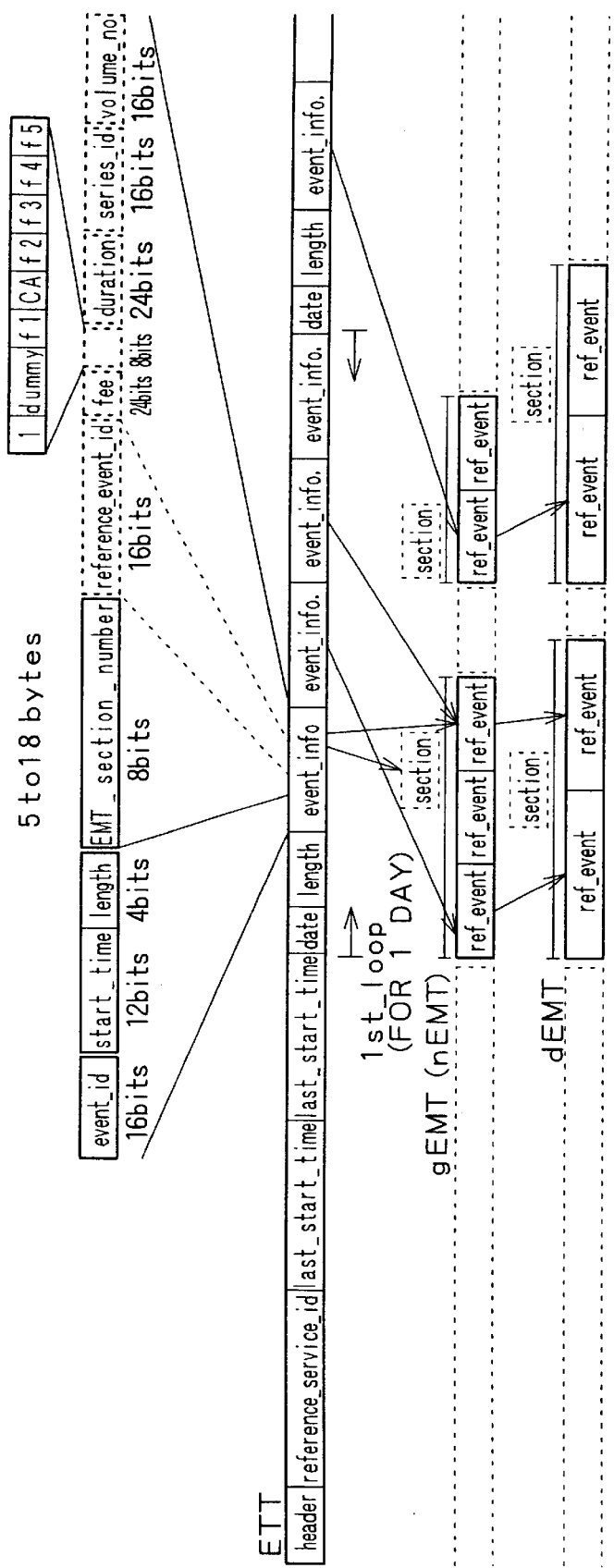
FIG. 8 is a diagram for explaining the reference relationship between an ETT and an EMT.

Thus, as shown in FIG. 8, in an ETT, a header is arranged at its leading edge, and next to it is arranged a "reference_service_id". A service (corresponding to a so-called channel) consists of a plurality of consecutive events, and the "service_id" is the identification code of this service, which is "network_id_unique". This is supposed to be a "service_id" in a real service, but a "reference_service_id" in a dummy service. The "reference_service_id" prescribed in this ETT represents the "reference_service_id" of the EMT to be referred to.

A "first_start_time" expresses in bytes the "start_time" of the earliest in "start_time" (broadcast start time) out of the events included in that section, and the "last_start_time" denotes the "start_time" of the latest in "start_time" of the events included in that section.

A loop represents the extent to which 1 day's program table is stated, and a "date" indicates the date of the broadcast start of events included in that day's loop. The "length" indicates the length of this loop.

Further next to that, "event_info" is stated as many times as the number of programs broadcast on that day.

The first "event_id" of each "event_info" denotes the identification code of that program. A "start_time" denotes the broadcast start time of that program. A "length" denotes the length of that "event_info" at and after the next "EMT_section_number".

In an "EMT_section_number", the "section_number" of the EMT in which common information of that event is stated. Thus, as individual information of the program is stated in ETT, the "section_number" of the EMT in which common information to be referred to is stated here. In a "reference_event_id", the "reference_event_id" of the dummy event in which common information is stated is stated. The dummy service, which is a virtual service for stating common service information and stating the EMT, has a "reference_service_id". A dummy event means an artificial event included in a dummy service for detecting the EMT. A "reference_event_id" is the "event_id" of a dummy event.

Thus, an "EMT_section_number" designates the section of a gEMT (or an nEMT) to be referred to, and a "reference_event_id" designates a dummy event in that section.

A "fee" states the fee for viewing that program (event). The 8 bits following the "fee" represent a flag, of which f1 is made "1" when the CA of the next 1 bit is valid or "0" when it is invalid. The next CA is a flag indicating whether "conditional access" is valid or invalid. The next f2 indicates whether or not a "duration" is prescribed in this ETT; f3, whether or not a "series_id" is prescribed in this ETT; and f4, whether or not a "volume_no" is prescribed in this ETT.

A "duration" indicates the length of the "event". A "series_id" is an identification sign of that event. A "series" means a set of specific "event"s over the "service".

A "volume_no" indicates the "volume" of the "event". For instance, where the "event" is a drama or the like and one of a series of "event"s consisting of first, second, third, . . . installments, it indicates which installment the particular event is.

In the gEMT (or nEMT) referred to in such an ETT is stated information other than the outline document of the "event" stated in the dEMT, and in the dEMT referred to in the gEMT (or nEMT) is stated the outline document of that "event".

To add, in the gEMT (or nEMT) is also stated the category of that "event".

As illustrated in FIG. 7, in the case of an ordinary channel (not an NVOD channel), one each of ETT, gEMT and dEMT is present on 1 channel.

By contrast, on an NVOD channel, an ETT is prescribed for each channel on which pictures of each timing of NVOD are to be distributed, and each ETT refers to the nEMT of dummy channels. In this case, the dummy channels corresponding to the respective real NVOD channels are made common. And one each of nEMT and dEMT is prescribed.

As illustrated in FIG. 8, the common "reference_event_id" of the gEMT (or nEMT) can be referred to by a plurality of "event_info"s of ETT. In this respect, as shown in FIG. 16, there is a difference from the prior art according to which the "gEIT" and "dEIT" were individually readied for each real channel. Therefore, in this mode of implementation, since different "event"s can refer to the same gEMT, the quantity of data to be transmitted can be that much reduced. Especially in multi-channel broadcasting, the same program is often broadcast repeatedly. In such a case, different ETTs would frequently refer to the same gEMT. Therefore, the quantity of data to be transmitted can be that much reduced.

Also in the mode of carrying out the present invention, ETT shown in FIG. 8 transmits, for instance, a program schedule for 1 week in a plurality of consecutive sections. As the maximum length of 1 section is 4096 bytes, sufficiently greater than the 188-byte pack length of a transport stream of MPEG2, no program schedule in which some programs are in effect absent as a result of division into 3-hour segments, as according to the prior art, will be generated, resulting in the elimination of the necessity to transmit data in vain. Therefore, this aspect, too, helps to save the quantity of data to be transmitted.

Furthermore, the following circumstance also serves to reduce the quantity of data transmitted. Thus, where the "event" is an installment of a serial program as mentioned above, there are many duplications, as shown in FIGS. 9A and 9B, between the introductory message for the first installment of the program (FIG. 9A) and the introductory message for the second installment of the program (FIG. 9B). The title of the program and an introductory message for it are stated in a "name_descriptor" and a "content_descriptor" in the EMT. In this mode of carrying out the invention, an "add_name_descriptor" and an "add_content_descriptor" are further added to these. And, as stated above, because this is a serial program, a "volume_number" is prescribed in the ETT for stating the "event_id" of the real event and the "start_time" of the "event". Therefore the position of the installment in the serial program is stated in this "volume_number".

Figure 10:
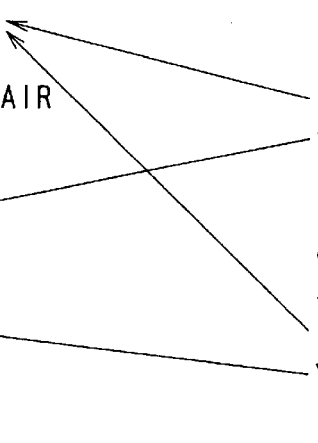
FIG. 10 is a diagram for explaining an application of a "volume_number".

The EPG processor 59 of the receiving apparatus 7, where a "volume_number" is present in the ETT, effects control so as to add the sentence of the corresponding "volume_number" in the "add_name_descriptor" to the title stated in the "name_descriptor" of the EMT referred to and to display it. As a result, for instance by stating as shown in FIG. 10, the character "(1)" or "(2)", indicating which installment of the program it is, is added after the title "The Story of a Love Affair", and is displayed.

Similarly, the EPG processor 59 adds the sentence of the corresponding "volume_number" in the "add_content_descriptor" to the content of the "content_descriptor" of the EMT and displays it. By this addition, next to the introductory message "Introductory message: In 8 installments. A work comically expressing the moves of a young woman's emotion. What will be the outcome of her love?", the sentence "The man who has suddenly appeared before Yukie . . . " is inserted for the first installment, and the sentence "Yukie suddenly meets him again. Then Yukie . . . " is inserted for the second installment and is displayed.

By doing so, the need to duplicate the common sentence in transmission is eliminated, and the efficiency of transmission can be enhanced.

Further in this mode of carrying out the invention, quicker retrieval is made possible. Thus, in the case of this mode of carrying out the invention, the program schedule is not divided into time segments, but the table is divided into an ETT stating the "event_id"s and start times of programs for a week and the section numbers in the gEMT to be referred to, and an EMT stating information on "event"s, and the program schedule for a week is stated in the ETT. Although the time range of the program schedule contained in the ETT is long, the data quantity of the ETT itself is small because information on substantive contents of "event"s is recorded in the EMT, and accordingly retrieval can be quickly accomplished. Necessary information on the retrieved program is read out of the EMT as appropriate.

Further according to the present invention, as information on NVOD channels is stated in an nEMT, it is possible, for instance, to retrieve and display only NVOD programs. In this case, the EPG processor 59 retrieves the nEMT, reads out the titles of "event"s stated there, and causes them to be displayed as, for example, illustrated in FIG. 11. Since only the nEMT is searched (the gEMT is not searched) at this time, fast retrieval is made possible. For this search, it is to be stated in advance the genre of each program and the pronunciation of the title of each program. In this way, it is made possible to search titles by genre and to display the retrieved titles in the order of the Japanese syllabary.

Incidentally, if the genres and pronunciations of the titles of programs are stated in gEMT as well, ordinary programs can be searched by genre and displayed in the order of the Japanese syllabary.

Furthermore, it is also possible to state an NVOD code in an nEMT. In this way, even where NVOD service is provided over different carrier waves (transponders), it is possible to prevent things like displaying the same title doubly.

Thus, the EPG processor 59, if an NVOD code is stated, assumes that the program belongs to a common NVOD, and omits the displaying of its title. A "reference_event_id" is unique within the same carrier, and on a different carrier, even if the "reference_event_id" is the same, basically a different dummy event will be designated. Therefore, by this NVOD code, the fact of being the corresponding NVOD is designated.

Also in this mode of carrying out the invention, it is possible to retrieve the broadcast start times of all the prescribed NVOD programs from an ETT on the basis of the "reference_event_id" of a dummy event retrieved by an nEMT. FIG. 12 illustrates an example of displaying in this case. This example of displaying shows an instance in which a program entitled "Giant" is broadcast every hour from 18:00 on. This retrieval can also be made at high speed.

Further in this case, it is also possible to provide in an nEMT a part in which to state the "start_time" of a dummy event, and state the start time of the final run out of the start times of NVOD. In this way, that statement would make possible detection of the broadcast start time of the final run.

In an ETT, as an item "fee" is provided and fee charging information is stated there, if the charge differs with the broadcast time, this can also be displayed at the same time.

Further in this mode of carrying out the invention, fast searching and accordingly fast access is made possible for the following reason, too. Thus, in an ETT, the start time of the program and the section number in an EMT where information on that program is stated are stated. Since the quantity of information in an ETT can be made smaller than in an EMT by nearly two digits, even if data for 2 weeks are written in, the capacity can be comparatively small. Therefore if, for instance, this ETT is to be stored within the receiving apparatus, the capacity of the memory can be small. Or even if it is not stored, access will be easy.

In this mode of carrying out the invention, fast retrieval is made possible for the following reason as well. Thus, in the case of a rebroadcast program, all the common information on that program is stated in an EMT, and individual information is stated in an ETT. Therefore, the EMT would be smaller in data quantity than where the original event is wholly stated. Also, it is made possible to arrange main pieces of event information (EMT) without duplication (the same piece of event information will not be doubly retrieved from different tables), and to achieve faster retrieval. Duplicated displaying of a rebroadcast is also prevented.

Also in this mode of carrying out the invention, a program referring to the same EMT, for instance, is assumed to be a rebroadcast program, and only the rebroadcast program can be detected.

Incidentally, information on the reception fee and the like (CA) stated in the ETT can be stated in the EMT as well. The EPG processor 59 gives priority to information in the ETT if CA is stated in both the EMT and the ETT.

Furthermore, genre information can be stated not only in the gEMT (or nEMT) but also in the SDT. In multi-channel broadcasting, the genre of programs to be broadcast is often fixed to some extent for each channel, such as specializing in sports, specializing in news or specializing in music. Then, by stating a number of genres in the SDT as information incidental to the channel, it is made possible, when searching by genre, to retrieve the channel of the same genre as the genre to be searched and to further search programs only on that channel, thereby narrowing the range of searching and substantially shortening the searching time.

Figure 13:
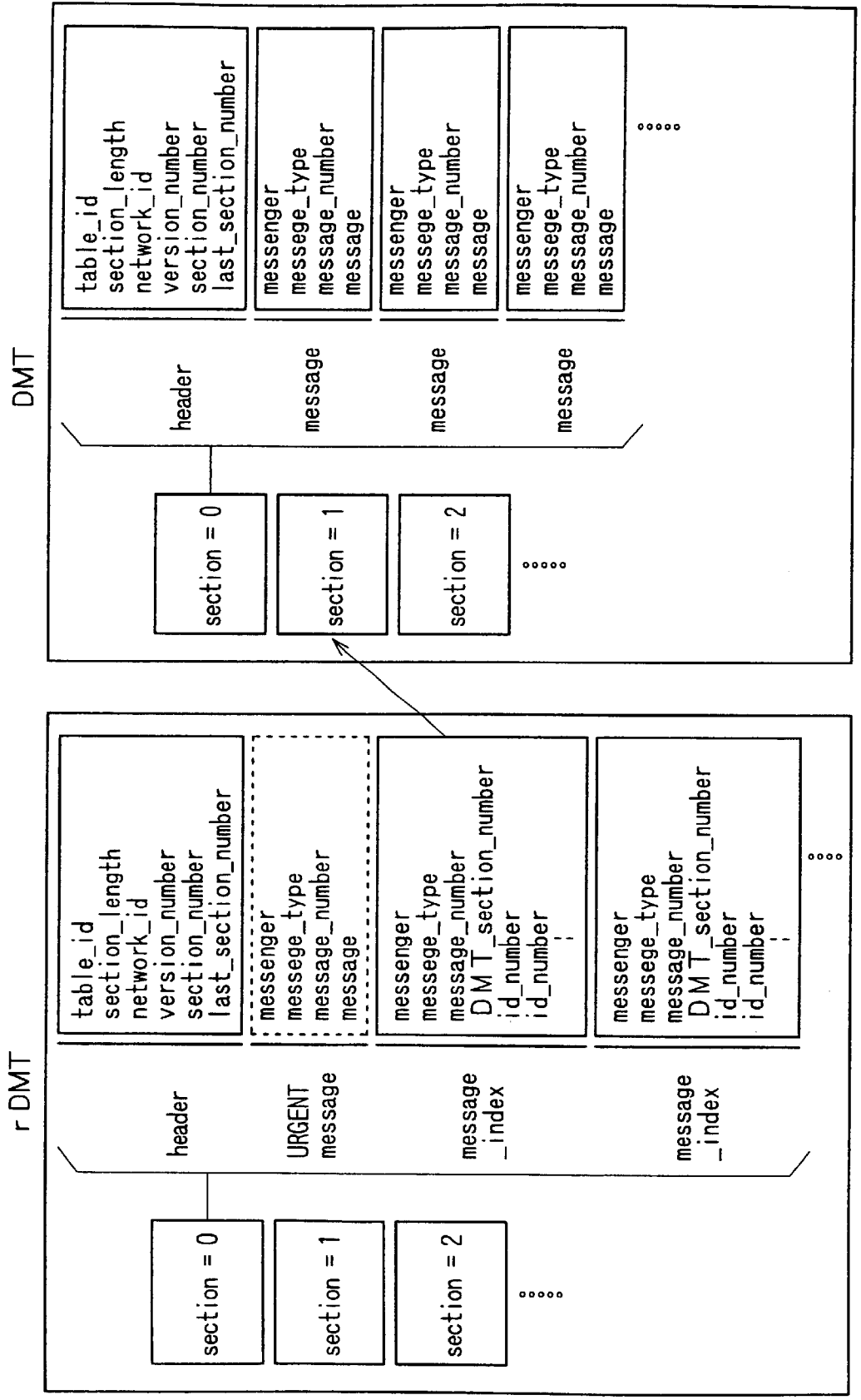
FIG. 13 is a diagram for explaining an rDMT and a DMT.

Next will be explained the rDMT and the DMT with reference to FIG. 13. As illustrated in FIG. 13, the DMT is also divided into sections, and in its "header" is registered such items as were described with reference to FIG. 5. However, as "table_id_extension" out of them, the "network_id" is registered. This "network_id" is the identification code of the network.

Next to the "header", a block of "message"s follows. In each "message" are registered a "messenger" indicating the originator of the message, a "message_type" indicating the level or the attribute of the message, a "message_number" which is the identification number of the message, and a "message" as content of the message.

By contrast, in an rDMT, basically as many "message_index"es as required are inserted next to the "header". In these "message_index"es are recorded a "messenger" indicating the originator of the message, a "message_type" indicating the level or the attribute of the message, and a "message_number" which is the number of the message. Further, into these "message_index"es is inserted a "DMT_section_number", where the section number of the DMT to be referred to (to which a corresponding message exists) is registered.

Also in the "message_index", the "id_number" of the provider of the program as originator of the message, the "id_number" of the provider of the receiving apparatus and the like are recorded.

Further into the rDMT, an urgent message to be transmitted, if any, is inserted. Thus, while an ordinary message is inserted into the DMT, an urgent message is registered in the rDMT in which essentially only indexes are registered.

Into an DMT, a total of 1024 messages can be inserted. As the maximum number of sections for transmission of a table is 256 and the maximum length of 1 section is 4096 bytes, the data quantity of messages is 1 Mbyte (=4096 bytes×256). Then, the maximum capacity per message being supposed to be 400 bytes, a total of 1024 messages can transmitted.

Figure 14:
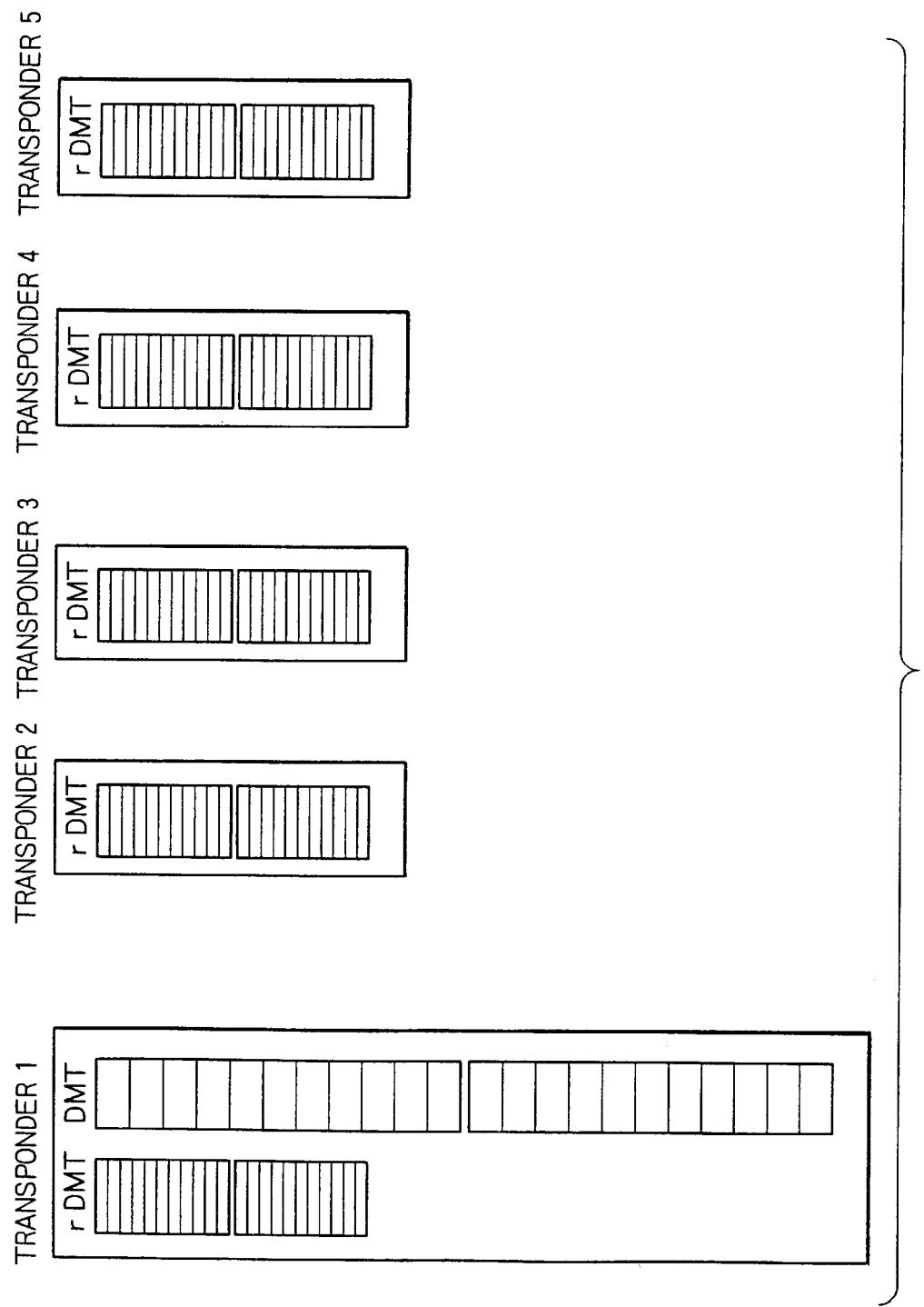
FIG. 14 is a diagram for explaining the relations of an rDMT and a DMT to transponders.

Since the DMT containing messages thus becomes a considerably large table, as illustrated in FIG. 14, it is inserted only into the stream corresponding to 1 transponder representative of a plurality of transponders (transponder 1 in the case of the example of FIG. 14). And the rDMT is inserted into streams corresponding to all the transponders. Therefore, a stream corresponding to whichever transponder each receiving apparatus may be receiving, any urgent message contained in the rDMT can be immediately received. In order to receive any other ordinary message, the stream of transponder 1 should be received.

If the DMT were inserted the stream of every transponder, as its data quantity is large, the capacity for the transmission of video signals as such would be that much lost. Therefore, in this way, the DMT is inserted only into the stream of a predetermined transponder.

As the capacity of the rDMT is not so great, even though it is inserted into the stream of every transponder, the capacity for the transmission of video signals as such is hardly lost. And as it is so disposed that index information on the DMT into which messages are inserted is recorded in this rDMT, the viewer, even if he or she is receiving the stream of a transponder not containing the DMT, can know the generation of a message without delay and, as required, read it as appropriate. And any urgent message, the stream of whichever transponder may be being received, can be immediately read. Since an urgent message is not frequently generated, usually the capacity of the transmission of video signals as such and the like is rarely lost.

As, in this manner, a dedicated DMT for the transmission of messages and an rDMT are ready, not only the network manager but also the program provider having the channel is enabled to transmit as appropriate such messages as an announcement of a special program, a notice of a campaign and a guide on the program viewing method.

Further, it is also made possible, by utilizing these messages, to readily inform the audience of a notice on downloading to replace the operation software of the receiving apparatus, particulars of any change and method.

Figure 15:
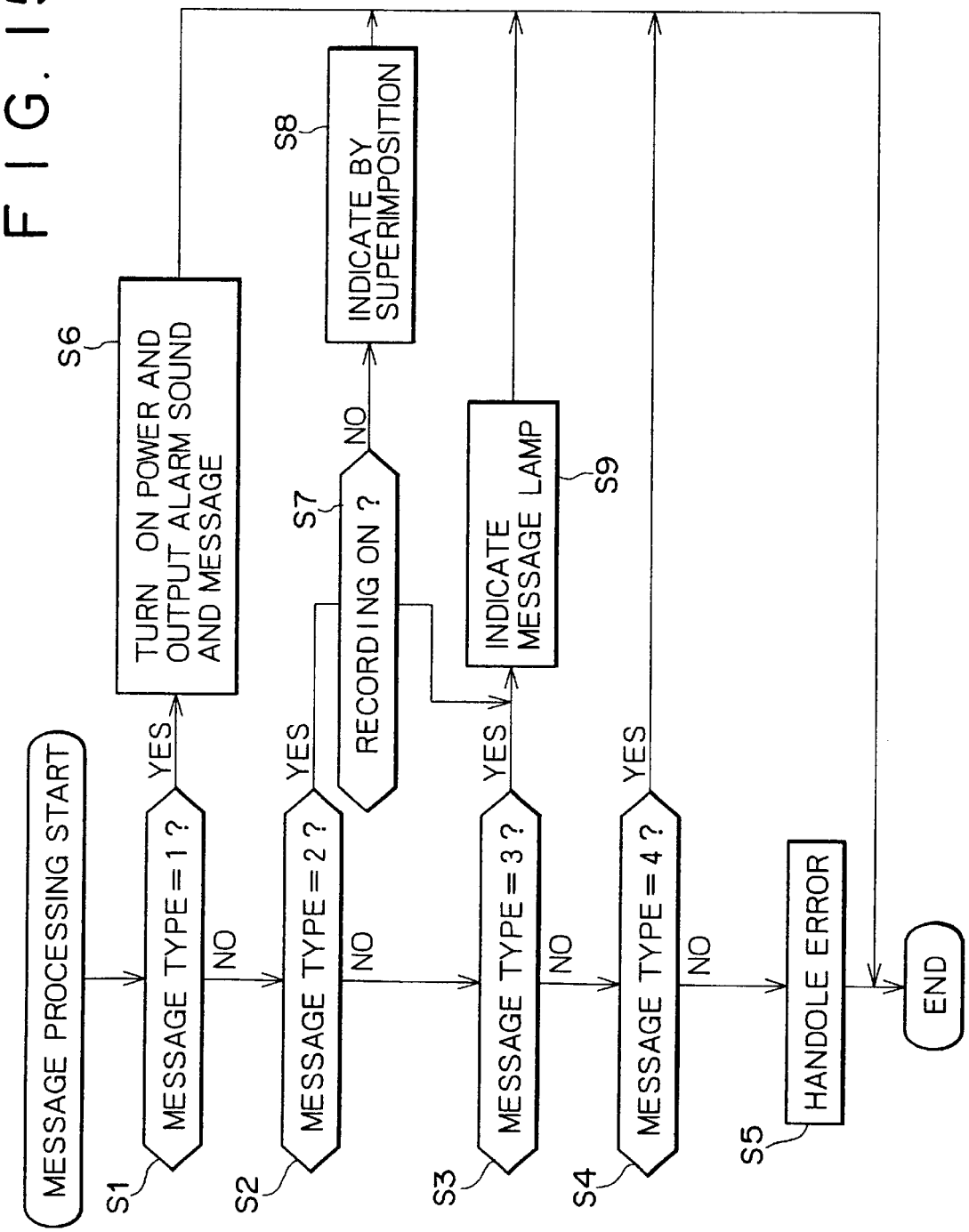
FIG. 15 is a flow chart for explaining message processing by the EPG processor in FIG. 4.

FIG. 15 illustrates an example of message processing accomplished by the EPG processor 59. At step S1 to step S4, it is determined which out of 1 to 4 the "message_type" contained in the "message_index" of the rDMT fits. If it is determined that the "message_type" is none of "1" to "4", error processing takes place at step S5.

If the "message_type" is determined to be "1" at step S1, proceeding to step S6, the EPG processor 59, even if the power supply to the receiving apparatus 7 has been turned off, turns it on, controls the D/A converting section 63 to have an alarm tone issued, at the same time generates data to have the received message displayed on screen, and causes them to be outputted from the NTSC encoder 62. This, in the event of reception of an urgent alarm message, enables every viewer to see and hear this message immediately without fail. Incidentally, this urgent alarm message is what is transmitted, for instance, in time of a disaster or the like.

If the "message_type" is determined to be "2" at step S2, proceeding to step S7, the EPG processor 59 inquires of the host processor 64 whether or not recording operation is taking place at the moment. In response to this inquiry, the host processor 64 supplies the current output of the NTSC encoder 62 to a video tape recorder or the like (not shown) to determine whether or not recording operation is being executed. The result of judgment is conveyed to the EPG processor 59. The EPG processor 59, if it determines that recording operation is not taking place at the moment on the basis of the notice from the host processor 64, proceeds to step S8, generates data to display the received message on screen, outputs them to the NTSC encoder 62, and causes them to be displayed superimposed on video signals.

If it is determined at step S7 that recording operation is taking place at the moment, proceeding to step S9, the EPG processor 59 requests the host processor 64 to turn on a message lamp. In response to this request, the host processor 64 turns on the message lamp 66. This enables the viewer to know that a message has been transmitted.

The viewer, when he or she has become aware of the generation of a message from the indication of the message lamp 66 and wants to know the content of that message immediately, instructs the host processor 64 to display the message. When this instruction is inputted, the host processor 64 controls the EPG processor 59 and requests the displaying of the message. In response to this request, the EPG processor 59 generates on-screen data of the received message, and supplies them to the NTSC encoder 62 to have them displayed.

Whereas an urgent message, whose "message_type" is "2", is also transmitted by the rDMT in the above-described manner, as its urgency is less than that of an urgent alarm message, this message is immediately displayed unless recording operation is taking place at the moment, but if recording operation is taking place, the message can be checked either immediately or afterwards at the option of the viewer. This prevents the message, superimposed over the video signals being recorded, from being superimposed and, every time the recorded video signals are played back, that superimposed message from being displayed.

If the "message_type" is determined to be "3" at step S3, proceeding to step S9 takes place, and message lamp indication processing is executed. Thus, in this case, as in the case where a message of "message_type=2" is received and recording operation is taking place, the viewer can read out the message either immediately or afterwards as required.

However, since messages after this "message_type=3" are transmitted by the DMT, when the viewer instructs the host processor 64 to receive the message, the host processor 64 display that message without delay if it is receiving the stream of the transponder containing the DMT, but if it is receiving the stream of the transponder containing the DMT, it will control the carrier selecting section 52 so that the stream of the transponder containing the DMT can be received. And the DMT will be extracted from the received stream, and the message in it will be displayed.

If the "message_type" is determined to be "4" at step S4, processing of step S9 is skipped. Thus, in this case, the message lamp is not turned on. Therefore, the viewer instructs the host processor 64 to indicate a message, spontaneously tries to see the message, and checks if there is any message or not.

Whereas the present invention has been described so far with reference to a case in which information is transmitted via a satellite, the invention can as well be applied to cases in which information is transmitted via a cable, such as in a CATV system.

To add, as transmission media by way of which a program to perform the above-described processing can be transmitted to users, communication media including networks and satellites can be used besides such recording media as magnetic disks and CD-ROMs.

As hitherto described, the information providing apparatus, information providing method, and transmission medium, as they are disposed to synthesize EPG information from the first information and the second information, make it possible to transmit EPG information efficiently in a small volume of transmission. As a result, quick retrieval of EPG information is made possible.

The above-described information receiving apparatus, information receiving method, and transmission medium as they are disposed to receive EPG information generated by synthesizing the first information and the second information, to extract the EPG information from received signals and to control its displaying, make it possible to reliably extract and process the efficiently transmitted EPG information with a small transmission capacity.

The above-described information providing system, information providing method and transmission medium, as they are disposed to synthesize the first information and the second information, to transmit them as EPG information, to extract the EPG information from received signals and to control its displaying, make it possible to transmit and utilize EPG information efficiency with a small transmission capacity.

What is claimed is:

1. A method of transmitting information, said method comprising:

generating, for a dummy channel associated with at least one real channel, at least one data table;

generating, for said real channel, a further data table that includes an identification code of an event, at least one start time of said event, and at least one reference to a location of information stored within said data table of said dummy channel; and forming a bit stream comprised of said data table and said further data table.

2. The method of claim 1 further comprising transmitting said bit stream.

3. The method of claim 1 wherein said data table includes information concerning said event that is independent of its occurrence, and said further data table includes information concerning a respective occurrence of said event.

4. The method of claim 1 wherein said event is a broadcast of a television program.

5. The method of claim 1 wherein said further data table includes information concerning at least one of the following: a date of said event, a duration of said event, a fee for said event, and an installment number of said event.

6. The method of claim 1 wherein said data table includes information concerning at least one of the following: a genre of said event, a title of said event, and an indicator of a near video on demand (NVOD) event.

7. The method of claim 1 wherein said further data table includes a plurality of references to a plurality of locations of information within said data table.

8. The method of claim 7 wherein at least two of said plurality of references refer to a common location of information within said data table.

9. The method of claim 1 wherein said dummy channel is associated with a plurality of real channels that are near video on demand (NVOD) channels.

10. The method of claim 9 wherein said further data table is generated for each of said plurality of real channels.

11. The method of claim 1 wherein said first generating step includes generating, for said dummy channel, an additional data table; and said data table includes at least one reference to a location within said additional data table.

12. An apparatus for transmitting information, said apparatus comprising:

a generating section for generating, for a dummy channel associated with at least one real channel, at least one data table;

a further generating section for generating, for said real channel, a further data table that includes an identification code of an event, at least one start time of said event, and at least one reference to a location of information stored within said data table of said dummy channel; and an encoder for forming a bit stream comprised of said data table and said further data table.

13. The apparatus of claim 12 further comprising an output for transmitting said bit stream.

14. The apparatus of claim 12 wherein said data table includes information concerning said event that is independent of its occurrence, and said further data table includes information concerning a respective occurrence of said event.

15. The apparatus of claim 12 wherein said event is a broadcast of a television program.

16. The apparatus of claim 12 wherein said further data table includes information concerning at least one of the following: a date of said event, a duration of said event, a fee for said event, and an installment number of said event.

17. The apparatus of claim 12 wherein said data table includes information concerning at least one of the following: a genre of said event, a title of said event, and an indicator of a near video on demand (NVOD) event.

18. The apparatus of claim 12 wherein said further data table includes a plurality of references to a plurality of locations of information within said data table.

19. The apparatus of claim 18 wherein at least two of said plurality of references refer to a common location of information within said data table.

20. The apparatus of claim 12 wherein said dummy channel is associated with a plurality of real channels which are near video on demand (NVOD) channels.

21. The apparatus of claim 20 wherein said further data table is generated for each of said plurality of real channels.

22. The apparatus of claim 12 wherein said generating section is adapted for generating, for said dummy channel, an additional data table; and said data table includes at least one reference to a location within said additional data table.

23. A readable medium for storing instructions for transmitting information, said instructions comprising instructions for:

generating, for a dummy channel associated with at least one real channel, at least one data table;

generating, for said real channel, a further data table that includes an identification code of an event, at least one start time of said event, and at least one reference to a location of information stored within said data table of said dummy channel; and forming a bit stream comprised of said data table and said further data table.

24. A method of receiving transmitted information, said method comprising:

receiving at least one bit stream;

forming, from said bit stream, at least one data table associated with a dummy channel that corresponds to at least one real channel;

forming, from said bit stream, a further data table associated with said real channel;

reading, from said further data table, an identification code of an event, at least one start time of said event, and at least one reference to a location within said data table;

reading, from said data table, information stored at said location;

generating video data using said information stored in said data table; and displaying said video data on said real channel.

25. The method of claim 24 wherein said video data is generated using said information stored in said data table and using additional information stored in said further data table.

26. The method of claim 24 wherein said data table includes information concerning said event that is independent of its occurrence, said further data table includes information concerning a respective occurrence of said event, and said video data is generated by inserting at least a portion of said information concerning a respective occurrence of said event into said information concerning said event that is independent of its occurrence.

27. The method of claim 24 wherein said event is a broadcast of a television program.

28. An apparatus for receiving transmitted information, said apparatus comprising:

a receiver for receiving at least one bit stream;

at least one processor for forming, from said bit stream, at least one data table associated with a dummy channel that corresponds to at least one real channel; said processor forming, from said bit stream, a further data table associated with said real channel; said processor reading, from said further data table, an identification code of an event, at least one start time of said event, and at least one reference to a location within said data table; said processor reading, from said data table, information stored at said location; said processor generating video data using said information stored in said data table; and said processor displaying said video data on said real channel.

29. The apparatus of claim 28 wherein said video data is generated using said information stored in said data table and using additional information stored in said further data table.

30. The apparatus of claim 28 wherein said data table includes information concerning said event that is independent of its occurrence, said further data table includes information concerning a respective occurrence of said event, and said video data is generated by inserting at least a portion of said information concerning a respective occurrence of said event into said information concerning said event that is independent of its occurrence.

31. The apparatus of claim 28 wherein said event is a broadcast of a television program.

32. A readable medium for storing instructions for receiving transmitted information, said instructions comprising instructions for:

receiving at least one bit stream;

forming, from said bit stream, at least one data table associated with a dummy channel that corresponds to at least one real channel;

forming, from said bit stream, a further data table associated with said real channel;

reading, from said further data table, an identification code of an event, at least one start time of said event, and at least one reference to a location within said data table;

reading, from said data table, information stored at said location;

generating video data using said information stored in said data table; and displaying said video data on said real channel.

33. A method of delivering information, said method comprising:

generating, for a dummy channel associated with at least one real channel, at least one data table;

generating, for said real channel, a further data table that includes an identification code of an event, at least one start time of said event, and at least one reference to a location of information stored within said data table of said dummy channel;

forming a bit stream comprised of said data table and said further data table;

transmitting said bit stream;

receiving said bit stream;

forming, from said bit stream, said data table;

forming, from said bit stream, said further data table;

reading, from said further data table, said reference to a location within said data table;

reading, from said data table, said information stored at said location;

generating video data using said information stored in said data table; and displaying said video data on said real channel.

34. A system for delivering information, said system comprising:

an apparatus for transmitting information, said transmitting apparatus comprising:

a generating section for generating, for a dummy channel associated with at least one real channel, at least one data table;

a further generating section for generating, for said real channel, a further data table that includes an identification code of an event, at least one start time of said event, and at least one reference to a location of information stored within said data table of said dummy channel;

an encoder for forming a bit stream comprised of said data table and said further data table;

an output for transmitting said bit stream;

an apparatus for receiving transmitted information, said receiving apparatus comprising:

a receiver for receiving said bit stream;

at least one processor for forming, from said bit stream, said data table; said processor forming, from said bit stream, said further data table; said processor reading, from said further data table, said reference to a location within said data table; said processor reading, from said data table, said information stored at said location; said processor generating video data using said information stored in said data table; and said processor displaying said video data on said real channel.

35. A readable medium for storing instructions for delivering information, said instructions comprising instructions for:

generating, for a dummy channel associated with at least one real channel, at least one data table;

generating, for said real channel, a further data table that includes an identification code of an event, at least one start time of said event, and at least one reference to a location of information stored within said data table of said dummy channel;

forming a bit stream comprised of said data table and said further data table;

transmitting said bit stream;

receiving said bit stream;

forming, from said bit stream, said data table;

forming, from said bit stream, said further data table;

reading, from said further data table, said reference to a location within said data table;

reading, from said data table, said information stored at said location;

generating video data using said information stored in said data table; and displaying said video data on said real channel.

* * * * *